(12) United States Patent
Oroskar

(10) Patent No.: US 8,349,175 B1
(45) Date of Patent: Jan. 8, 2013

(54) ROTARY VALVE APPARATUS FOR SIMULATED MOVING BED SEPARATIONS

(75) Inventor: Anil R. Oroskar, Oak Brook, IL (US)

(73) Assignee: Orochem Technologies, Inc., Lombard, IL (US)

( * ) Notice: Subject to any disclaimer, the term of this patent is extended or adjusted under 35 U.S.C. 154(b) by 0 days.

(21) Appl. No.: 13/506,057

(22) Filed: Mar. 23, 2012

(51) Int. Cl.
*B01D 15/08* (2006.01)
(52) U.S. Cl. .................. 210/198.2; 210/424; 210/659
(58) Field of Classification Search .................. 210/635, 210/656, 659, 198.2, 424; 137/601.05, 625.15, 137/625.17, 625.5
See application file for complete search history.

(56) References Cited

U.S. PATENT DOCUMENTS

| | | |
|---|---|---|
| 2,985,589 A | 5/1961 | Broughton |
| 3,201,491 A | 8/1965 | Stine |
| 3,422,848 A | 1/1969 | Liebman |
| 4,157,267 A | 6/1979 | Odawara |
| 4,182,633 A | 1/1980 | Ishikawa |
| 4,313,015 A | 1/1982 | Broughton |
| 4,319,929 A | 3/1982 | Fickel |
| 4,409,033 A | 10/1983 | LeRoy |
| 4,498,991 A | 2/1985 | Oroskar |
| 4,614,205 A | 9/1986 | Oroskar |
| 4,632,149 A | 12/1986 | Oroskar |
| 4,764,276 A | 8/1988 | Berry |
| 5,681,376 A | 10/1997 | Wooten |
| 6,537,451 B1 * | 3/2003 | Hotier ................... 210/198.2 |
| 7,141,172 B2 * | 11/2006 | Wang et al. .............. 210/659 |
| 7,473,368 B2 | 1/2009 | Hotier |
| 7,544,293 B2 * | 6/2009 | Oroskar et al. ........... 210/198.2 |
| 2005/0222482 A1 * | 10/2005 | Lee et al. ................... 585/820 |
| 2006/0273013 A1 * | 12/2006 | Chin et al. ................. 210/656 |
| 2007/0068873 A1 * | 3/2007 | Oroskar et al. ............ 210/659 |
| 2007/0149841 A1 * | 6/2007 | Lee et al. ................... 585/826 |

OTHER PUBLICATIONS

Hastelloy From Wikipedia undated.*
Stanley A. Gembicki, Rekoske, James, Oroskar, Anil, Johnson, James, "Adsorption, Liquid Separation", Published Online Jul. 19, 2002, John Wiley & Sons, Inc., http://onlinelibrary.wiley.com/doi/10.1002/0471238961.0104191507051302.a01.pub2/abstract.

* cited by examiner

*Primary Examiner* — Ernest G Therkorn
(74) *Attorney, Agent, or Firm* — Richard P. Silverman

(57) ABSTRACT

The apparatus of the present invention relates to rotary valves which provide simultaneous interconnection of a plurality of asymmetrically disposed stationary adsorption chambers in fluid communication with an upper stator of the rotary valve having a lower rotor which upon indexing in accordance with a predetermined periodic sequence provides a simulating bed moving process. Further, the apparatus relates to such combinations of adsorbent chambers and rotary valves in a manner which is useful for implementing a simulating moving bed process wherein the continuous contacting of fluids and solids occurs in order to affect a separation or a purification process in a substantially plot area than previous SMB systems using turntable arrangements of adsorbent chambers.

9 Claims, 11 Drawing Sheets

ROTARY VALVE APPARATUS FOR SIMULATED MOVING BED SEPARATIONS

FIELD OF THE INVENTION

This invention concerns generally with an apparatus for a multiport rotary valve. More particularly, it relates to such valves which provide simultaneous interconnection of a plurality of stationary sorbent chambers in accordance with a predetermined periodic sequence. Further, it relates to such valves which are useful for implementing a simulating moving bed process wherein the continuous contacting of fluids and solids occurs in order to affect a separation or a purification process.

BACKGROUND

The separation of various substances through selective absorption using a simulated moving bed of adsorbent is an example of a process in which a multiport rotary disc valve is useful. Simulation of a moving sorbent bed is described in U.S. Pat. No. 2,985,589 (Broughton et al.), which is mentioned above. In accomplishing this simulation, it is necessary to connect a feed stream to a series of beds in sequence, first to bed no. 1, then to bed no. 2, and so forth for numerous beds, the number of beds often being between 12 and 24. These beds may be considered to be portions of a single large bed whose movement is simulated. Each time the feed stream destination is changed, it is also necessary to change the destinations (or origins) of at least three other streams, which may be streams entering the beds, such as the feed stream, or leaving the beds. The moving bed simulation may be imply described as dividing the bed into series of fixed beds and moving the points of introducing and withdrawing liquid streams past the series of fixed beds instead of moving the beds past the introduction and withdrawal points. A rotary valve used in the Broughton process may be described as accomplishing the simultaneous interconnection of two separate groups of conduits.

There are many different process requirements in moving bed simulation processes, resulting in different flow schemes and thus variations in rotary valve arrangement. For example, in addition to the four basic streams described in Broughton (U.S. Pat. No. 2,985,589), it may be desirable to utilize one or more streams to purge, or flush, a pipeline or pipelines. A flush stream is used to prevent undesirable mixing of components. The flush substance is chosen to be one which is not undesirable for mixing with either main stream, that being purged or that which enters the pipeline after flushing is completed. U.S. Pat. No. 3,201,491 (Stine et al.) may be consulted for information on flushing lines as applied to the process of Broughton (U.S. Pat. No. 2,985,589). It may be desirable to pass fluid through a bed or beds in the reverse direction from normal flow. This is commonly known as backflushing, a subject treated in U.S. Pat. No. 4,319,929 (Fickel). Other applications for various arrangements of multiport rotary disc valves may be seen in U.S. Pat. Nos. 4,313, 015 (Broughton); 4,157,267 (Odawara et al.); 4,182,633 (Ishikawa et al.); and 4,409,033 (LeRoy).

Multiport rotary disc valves of the general arrangement shown in the above patents have been fabricated in various sizes up to valves utilizing 4½ foot diameter rotors. These valves have seven concentric circumferential grooves, or tracks, and 24 ports spaced around the periphery of the stator. A single valve of this size weighs approximately 26,000 pounds, has an overall height of about 15 feet, and occupies a plan area of approximately 8½ by 8½ feet. These figures do not include a separate hydraulic power unit used with the hydraulically driven actuator mounted on the valve proper.

U.S. Pat. No. 4,764,276 (Berry et al.) discloses a continuous contacting device wherein a fluid stream may be contacted with a particulate exchange material. The device includes a plurality of rotating chambers filled with particulate material. Fluid is supplied individually to these chambers through a plurality of feed ports which are in periodic fluid communicating relation with each of the rotating adsorbent chambers.

Large rotating turntables or carriages supporting sorbent chambers filled with adsorbent material and liquid present an engineering problem to uniformly support the weight and the movement of the rotating sorbent chambers, and represent a technical challenge to maintain the stator and rotor seating surfaces in proper registration and in fluid-tight contact to prevent loss of fluid or contamination of the final product.

Rotary valves typically comprise a discoid stator which is in a fixed position and a rotor which is indexed through a predetermined cycle to direct the distribution flows in a simulated moving bed process. As mentioned hereinabove, commercial use of rotary valves in high capacity processes has generally employed rotary valves having large diameter lower stators having concentric groves or pipes and supporting an upper rotor for directing the flows in continuous contacting devices for carrying out simulated moving bed processes. Such valves are employed in conjunction with a single multi-stage sorbent chamber having multiple inlets and outlets to create the necessary concentration profiles throughout the single adsorbent chamber. Small-scale processes have employed upper fixed position stators having a plurality of sorbent chambers which are supported in direct fluid communication with a lower rotor, wherein the rotor and all of the adsorbent chambers are on a turntable structure which rotates about the stator with the indexing of the valve rotor. Such turntable arrangements also suffer from the requirement for very large plot areas, and the engineering and technical difficulties of maintaining a proper seal during the rotation or indexing of the valve through the cycle. The turntable structure requires the uniform and symmetrical arrangement of the adsorbent chambers disposed about the center of rotation of the turntable. It can be appreciated that it is desirable to use an apparatus of less bulk and weight to accomplish the same functions and avoid rotary valves with large plot area footprints, and avoid the technical and engineering problems related to maintaining a fluid-tight seal while rotating all of the adsorbent chambers with the rotation of the rotor.

BRIEF SUMMARY OF THE INVENTION

The invention relates to employing simulated moving bed (SMB) processes with an improved rotary valve in small to mid scale processes with a minimum of engineering and technical problems. In the present invention, the requirement for having a rotating plurality of sorbent chambers is eliminated which results in an improved rotary valve apparatus which has a much smaller footprint in a process area. Furthermore, the internal organization of the valve provides flexibility in the physical placement of the sorbent chambers in the plot area of the SMB process. Still further, unlike typical SMB systems, wherein a separate liquid circulating pump is required in each adsorbent zone to pump liquid from the bottom outlet of one adsorbent chamber or zone to the top inlet of the next adsorbent chamber or zone, the SMB system of the instant invention requires only a single liquid circulating pump to provide continuous flow in each adsorbent chamber of the plurality of the adsorbent chambers in the SMB apparatus. Having only a single pump significantly eliminates the requirement for a complicated liquid circulating pump control system.

In one embodiment, the invention is a simulated moving bed apparatus for carrying out a simulated moving bed process. The apparatus comprises a plurality of n stationary sorbent chambers ($C_i$), a rotary valve, and a means for indexing the rotary valve according to a previously determined cycle. Each of the plurality of stationary sorbent chambers $C_i$ comprises sorbent material. Each of the stationary sorbent chambers has a top conduit ($T_i$) and a bottom conduit ($B_i$) to permit the flow of fluid to and from each of the stationary sorbent chambers. The rotary valve has an axis of rotation about which when indexed directs distribution of fluids into and out of the plurality of n stationary sorbent chambers $C_i$ in the previously determined cycle. The rotary valve comprises an upper stator, a lower rotor, a plurality of jumper lines, at least one feed conduit, at least one desorbent conduit, at least one raffinate conduit, at least one extract conduit, a plurality of crossover pipes, and a lower rotor enclosure. The upper stator has a substantially flat seating surface, a plurality of 2n stator upper ports $U_j$ and a plurality of 2n stator lower ports $L_j$. Each of the stator upper ports $U_j$ extends through the upper stator to the substantially flat seating surface forming a plurality of 2n stator upper openings $UPO_j$ in the substantially flat seating surface to provide fluid communication with each of the top conduits $T_i$ and each of the bottom conduits $B_i$ associated with stationary sorbent chamber $C_i$. The top conduits $T_i$ and each of the bottom conduits $B_i$ are disposed in top/bottom pairs $T_i/B_i$ such that each top conduit $T_i$ is adjacent to each corresponding bottom conduit $B_i$. The top/bottom pairs $T_i/B_i$ are disposed radially about the axis of rotation clockwise in sequential order from 1 to n stationary chambers. The plurality of 2n stator upper port openings $UPO_j$ are disposed symmetrically about the axis of rotation describing an inner circle. The plurality of 2n stator lower ports $L_j$ extend through the upper stator to the substantially flat seating surface forming a plurality of 2n lower port openings $LPO_j$ being disposed symmetrically about the axis of rotation and describing an outer circle of lower port openings $LPO_j$ in said substantially flat seating surface. The plurality of n jumper lines $J_i$ are external to the rotary valve in fluid communication with and to provide fluid transfer between adjacent pairs of stator lower ports $L_j$. Each jumper line $J_i$ is disposed counter-clockwise about the axis of rotation such that jumper line $J_i$ provides fluid transfer between the top conduit $T_i$ and the bottom conduit $B_{(i-1)}$ in the previously determined cycle. The at least one feed conduit, the at least one desorbent conduit, the at least one raffinate conduit, and the at least one extract conduit are each in fluid communication with at least one different one of the plurality of jumper lines $J_i$ in the previously determined cycle. The lower rotor has a rotor seating surface which is in fluid-tight contact with the substantially flat seating surface of the upper stator. The lower rotor rotates about the axis of rotation to various valve positions in accordance with the previously determined cycle. The axis of rotation passes through the center of both the lower rotor and the upper stator and is normal to said rotor seating surface and said substantially flat seating surface. The lower rotor has a plurality of rotor upper ports and a plurality of rotor lower ports. Each of the rotor upper ports extend through the lower rotor to the rotor seating surface forming a plurality of rotor upper port openings $RUO_j$ in the rotor seating surface. Each of the rotor lower ports extend through the lower rotor to the rotor seating surface forming a plurality of rotor lower port openings $RLO_j$ in the rotor seating surface. The plurality of rotor upper port openings $RUO_j$ are disposed symmetrically about the axis of rotation describing an outer circle forming an outer group of rotor openings. The plurality of lower rotor openings $RLO_j$ are disposed symmetrically about the axis of rotation describing an inner circle and forming an inner group of rotor openings. Each of the plurality of the stator upper port openings $UPO_j$ are in register with a different one of the openings of the rotor lower port openings $RLO_j$ and each of the plurality of the stator lower port openings $LPO_j$ are in register with a different one of the openings of the rotor upper port openings $RUO_j$. The plurality of crossover pipes is connected to the lower rotor. Each crossover pipe communicates between two rotor openings in order to complete fluid transfer paths between conduits of the outer and inner groups of rotor openings in accordance with the previously determined cycle. The lower rotor enclosure has a hollow interior. The lower rotor enclosure completely encloses the plurality of crossover pipes and is in fluid-tight contact with the other side of the lower rotor such that the lower rotor enclosure rotates with the lower rotor when the rotary valve is indexed.

DETAILED DESCRIPTION OF THE INVENTION

Figure 1:
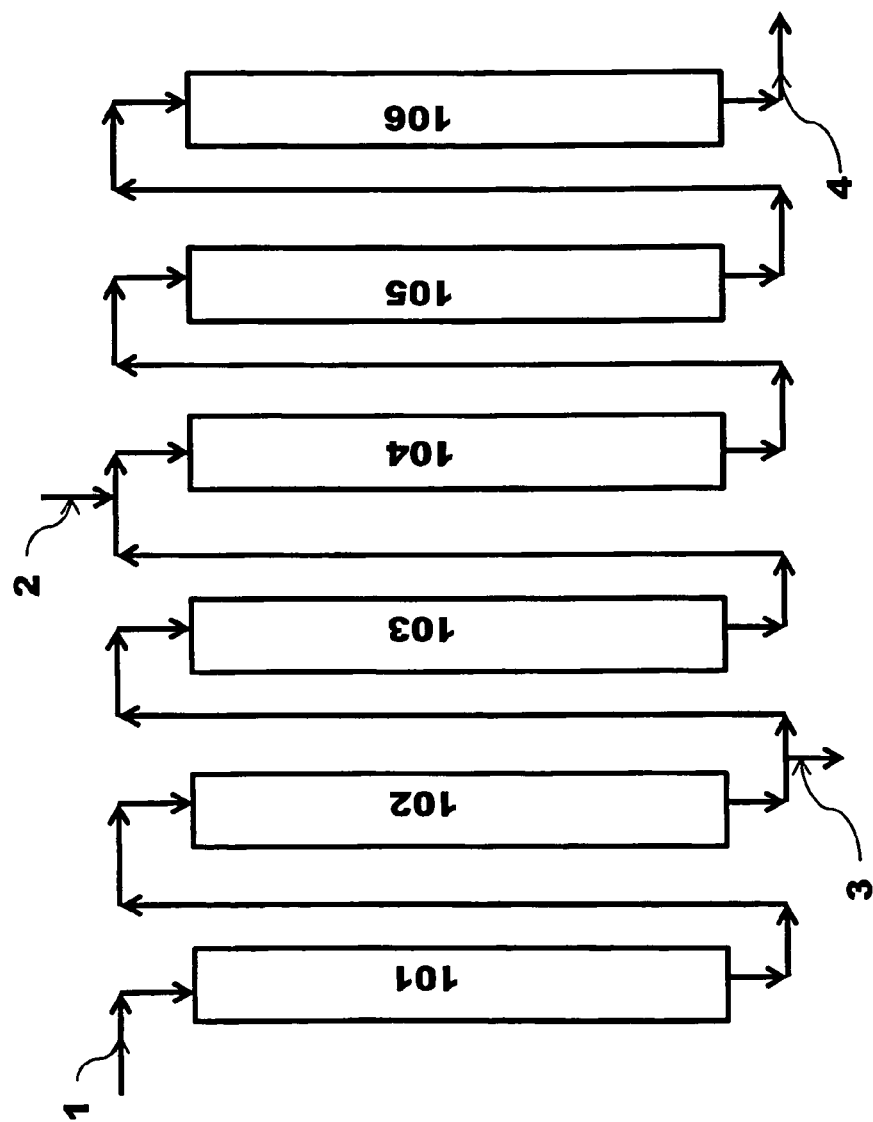
FIG. 1 depicts in schematic form a process arrangement for a 6-chamber simulated moving bed process.

The rotary valve apparatus of the present invention overcomes one of the major problems associated with the application of simulated moving bed technology into relatively small commercial plants in industries beyond large scale petrochemical complexes. More specifically, the rotary valve of the present invention provides significant plot area savings and operational reliability over conventional approaches. The following is a comparison of plot area savings for a range of technologies which show a significant reduction in the plot area requirements of from about 500 percent to about 1300 percent over conventional turntable style SMB plants. In turntable style SMB plants, all of the adsorbent beds are mounted on a very large rotating structure having an upper rotor which is structurally associated with the turntable and in fluid communication with all of the adsorbent beds as the turntable is rotated about the center of the rotary valve. Because of the size and weight limits to the structure and its ability to be rotated with the adsorbent chambers in the SMB cycle, the overall capacity of such plants is limited to a maximum capacity of about 250000 MTA. Other problems such as maintaining a fluid tight seal between the stator and the rotor portions of the rotary valve become critical to the successful operation of the overall process. Furthermore, each of the beds in a conventional turntable system must be balanced and symmetrically distributed about the turntable to maintain a proper seal between the stator and the rotor of the valve to avoid leakage or contamination. The rotary valve of the present does not require the symmetrical disposition of the sorbent beds, has no similar capacity limitation, and significantly reduces the plot area requirements. Still further, the rotary valves of the present invention permit the efficient use of multiple rotary valves in multi-stage SMB applications. Table 1 shows the relative plot area advantages of the rotary valve of the present in a variety of commercial applications. The plot area of conventional turntable SMB plants is a generally square area to accommodate the circular turntable supporting the rotating adsorbent chambers. For example, a conventional amine purification plant processing 400 MTA (Metric tonnes per annum) requires a 14 foot by 14 foot (18.2 m$^2$) plot area. Employing a rotary valve of the present invention reduced the plot area requirement to a 5 foot by 5 foot (2.3 m$^2$) plot area, representing a 780 percent decrease in plot area requirement. Such decreases in plot area requirements provide greater opportunity for the use of modular construction techniques to reduce the capital cost of equipment and improve plant reliability. The relative valve port size as the pipe diameter in cm is a representation of the size of the individual ports on the rotary valve.

TABLE 1

Comparison of Plot Area Reduction over Conventional Turntable Rotary Valve Applications

| Process Description | Relative Valve Port Size-Diameter, in./cm | Process Category | Process Throughput, MTA* | Prior Art/ Inventive Valve Footprint m$^2$ | Percent Reduction in Footprint |
|---|---|---|---|---|---|
| Amine Purification | 0.5/1.27 | Chemical | 400 | 18.2/2.3 | 780 |
| Ascorbic Acid | 1/2.54 | Deashing | 5000 | 30/5.94 | 500 |
| Ascorbic Acid | 1.5/3.81 | Deashing | 1000 | 30/5.94 | 500 |
| Biotin | 1/2.54 | Pharma | 5000 | 30/5.94 | 500 |
| Boiler Feed Water Demineralization | 3/7.62 | Deashing | 250000 | 83.6/13.4 | 625 |
| Boiler Feed Water Demineralization | 3/7.62 | Deashing | 250000 | 83.6/13.4 | 625 |
| Copper | 0.5/1.27 | Mining | 2000 | 9.3/2.32 | 400 |
| Corn Syrup | 1/2.54 | Deashing | 5000 | 30/5.94 | 500 |
| Corn Syrup | 2/5.08 | Deashing | 15000 | 54/9.3 | 576 |
| Corn Syrup | 2/5.08 | Deashing | 30000 | 83.6/13.4 | 625 |
| Copper/Vanadium Removal | 1.5/3.81 | Mining | 3000 | 30/2.32 | 1296 |
| Dextrose | 1.5 3.81 | | 10000 | 30/5.94 | 500 |
| Dextrose | 3/7.62 | | 100000 | 83.6/13.4 | 625 |
| Fructose | 3/7.62 | | 200000 | 83.6/13.4 | 625 |
| Gluconic Acid | 1.5/3.81 | | 400 | 30/5.94 | 500 |
| Isoflavones | 0.5/1.27 | | 500 | 18.2/2.32 | 780 |
| Isoflavones | 0.5/1.27 | | 3000 | 30/5.94 | 500 |
| Keto-Gluconic Acid | 1.5/3.81 | | 400 | 13.4/2.32 | 576 |

*Maximum Capacity for Conventional Turntable SMB units is 250 000 MTA (Metric Tonnes per Annum)

The following is a description of the embodiment of the invention shown in FIGS. 1 through 11. It is not intended that such description be construed as limiting the scope of the invention in any way; the description of this example is merely a convenient means to become familiar with the invention. The elements of the invention may be arranged to form other embodiments and more or fewer conduits than shown in the drawings may be accommodated. Although some of the figures illustrate a 6-adsorbent chamber SMB system, preferably, the number of adsorbent chambers in an SMB system of the present invention can range from 5 adsorbent chambers to 40 adsorbent chambers. More preferably, the number of adsorbent chambers can range from 10 adsorbent chambers to 30 adsorbent chambers.

FIG. 1 depicts a typical simulated moving bed processing system which will be used in describing the invention. As depicted in FIG. 1, there are six individual separation sorbent chambers, or sorption beds, denoted by reference numbers 101 through 106. There are conduits carrying four fluid streams (1, 2, 3, and 4), two streams entering the processing system and two leaving the processing system (as denoted by the arrows), feed 2, extract 3, desorbent 1, and raffinate 4. These four streams may be called process flows or process streams. The manner of interconnection of the separation units by means of conduits carrying several fluid streams varies in order to simulate movement of the stationary phase adsorbent or sorbent in the sorbent chambers in a direction which is countercurrent with the fluid flow of the desorbent in the SMB process.

Figure 2:
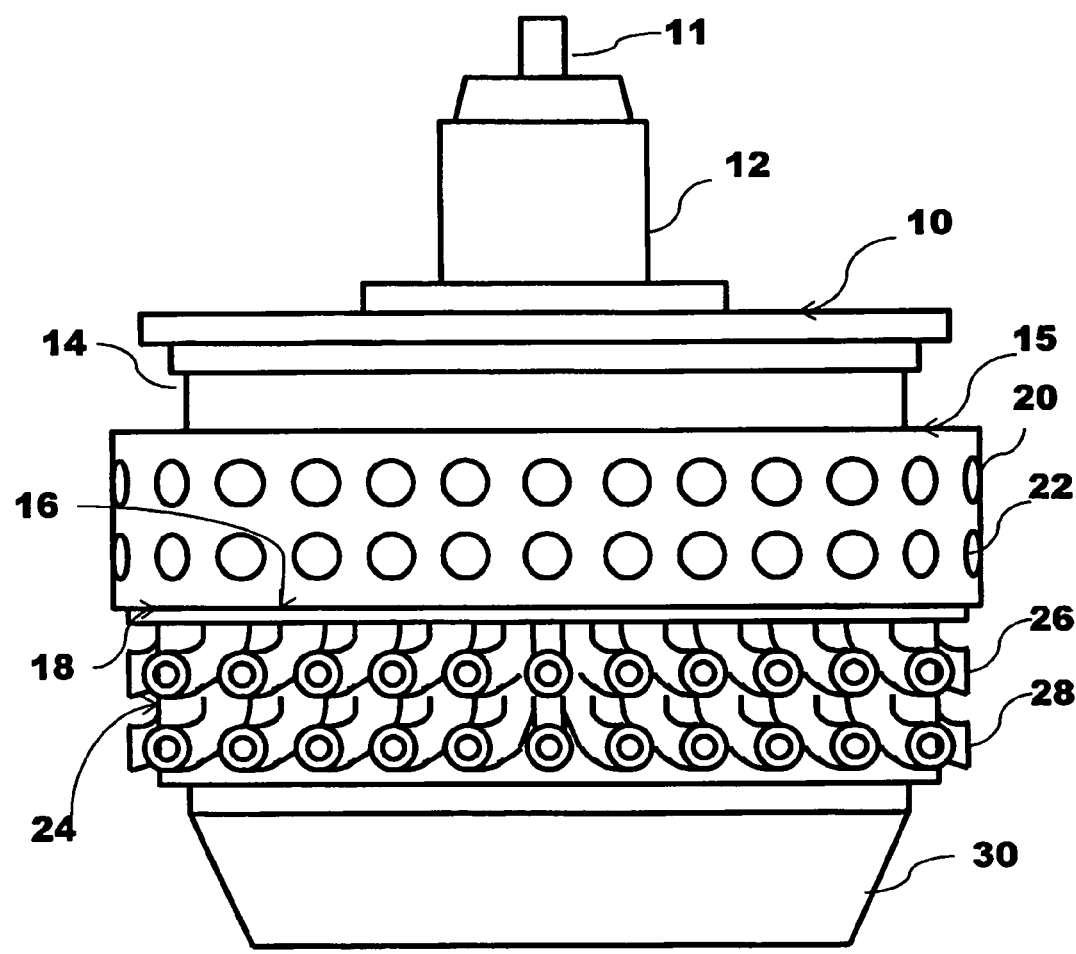
FIG. 2 is a schematic representation of a rotary valve of the present invention having an upper stator and a lower rotor.

FIG. 2 depicts a schematic illustration an elevation view of the rotary valve 10 embodiment of the present invention. Certain details, such as gaskets, seals, and external lines are omitted from FIG. 2, such elements being well-known in the art. With reference to FIG. 2, the rotary valve 10 has an upper stator 15, a lower rotor 24, a central shaft 11, and a means for turning or rotating the lower rotor 12. The central shaft 11 extends through valve mounting block 14, through the stationary upper stator 15, and through the lower rotor 24. The central shaft 11 is rigidly secured to the lower rotor by any conventional means such as a slot or a key such that the indexing of the means for turning or rotating the lower rotor is transmitted to the lower rotor and the rotary valve base 30 through the rotation of the central shaft 11. Optionally, the means for turning or rotating the lower rotor may be gear driven by a drive mechanism located on the circumference of the lower rotor. The rotary valve base is disposed below the lower rotor serves to provide support for the lower rotor as the lower rotor is rotated. The upper stator 15 is stationary and has a plurality of stator upper ports 20, a corresponding plurality of stator lower ports 22, and a substantially flat seating surface 16. The lower rotor 24 is substantially discoid and has a plurality of rotor upper ports 26, a plurality of rotor lower ports 28, and a rotor seating surface 18. The rotor seating surface 18 is in fluid-tight contact with the substantially flat seating surface of said upper stator. The means for turning or rotating the lower rotor or a means for indexing the rotary valve according to the previously determined cycle is a hydraulic, electrical, or electromechanical motor or similar device. Although not shown in FIG. 2, the rotor seating surface 18 and the substantially flat seating surface 16 may be maintained in fluid-tight contact by means of a gasket or other conventional sealing means (not shown) well-known in the art.

Figure 3:
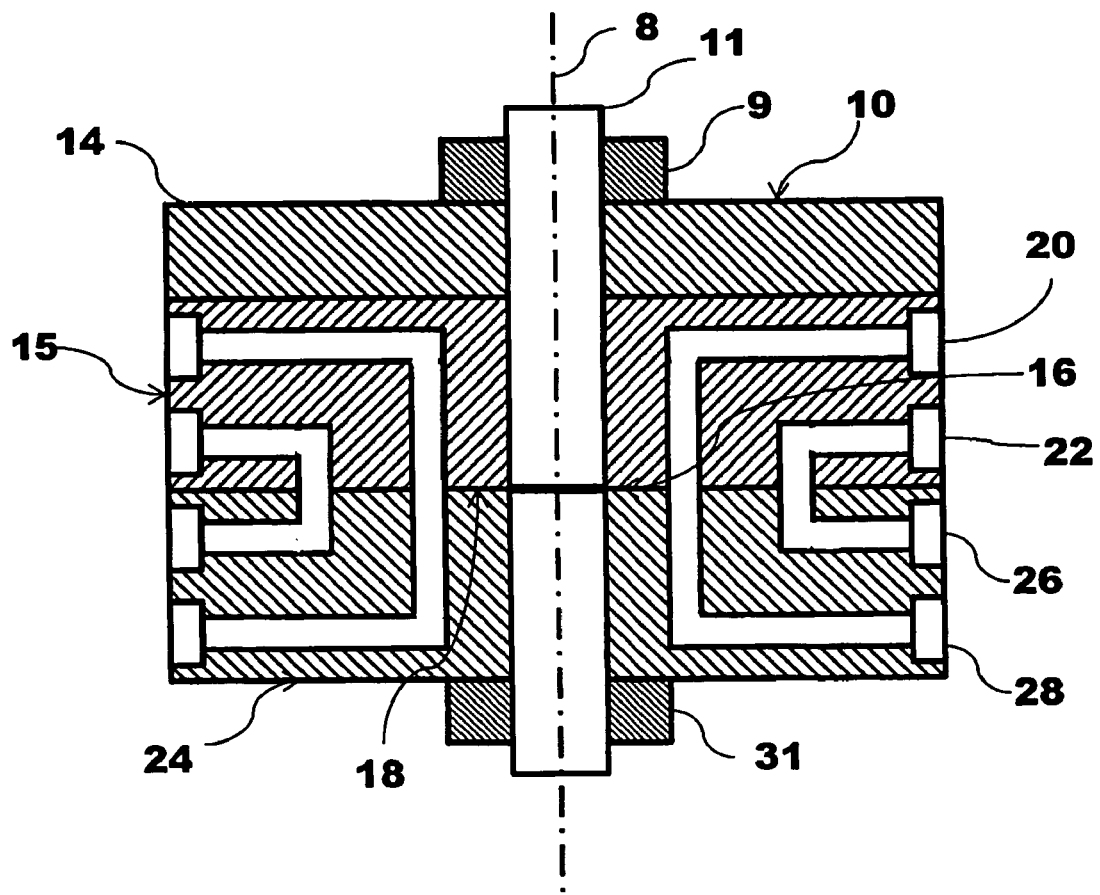
FIG. 3 is a sectional elevation view in schematic form of a typical multiport rotary disc valve embodying the invention showing the registration of ports in the upper stator and the lower rotor. Certain details of the valve have been omitted from the drawing as unnecessary to the complete description of the present invention.

FIG. 3 depicts a schematic cross sectional view of the rotary valve 10 embodiment depicted in FIG. 2. In FIG. 3, certain details, such as gaskets, are omitted being well-known in the art. The means for rotating the lower rotor 24 is not shown; however, the central shaft 11 is shown along the axis of rotation 8, extending through the valve mounting block 14, the upper stator 15, and the lower rotor 24. The substantially flat seating surface 16 of the upper stator and the rotor seating surface 18 are shown maintained in fluid-tight contact by locking collars 9 and 31. Compression springs or spring rings and packing (not shown) may also be employed to maintain the fluid-tight contact between the substantially flat seating surface of the upper stator 16 and the rotor seating surface 18. Referring to FIG. 3, the plurality of stator upper ports 20 extend through the upper stator and form a plurality of upper port openings in the substantially flat seating surface 16 in an inner circle of said stator upper port openings disposed symmetrically about the axis of rotation 8. The plurality of stator lower ports 22 extend through the upper stator 15 and form a plurality of stator lower port openings in the substantially flat seating surface 16, the stator port openings being disposed symmetrically in an outer circle symmetrically about the axis of rotation 8, at a point further displaced from the inner circle relative to the axis of rotation. A plurality of rotor upper ports 26 extend through the lower rotor 24 and form a plurality of rotor upper port openings in the rotor seating surface 18. A plurality of rotor lower ports 28 extend through the lower rotor 24 and form a plurality of rotor lower port openings in the rotor seating surface 18. The plurality of rotor upper port openings are disposed in the rotor seating surface 18 in an outer rotor circle forming an outer group of rotor openings and the plurality of rotor lower port openings are disposed in the rotor seating surface 18 in an inner circle forming an inner group of rotor port openings. The plurality of rotor upper port openings are disposed on the rotor seating surface in registration with the stator lower port openings and the rotor lower port openings are disposed on the rotor seating surface in registration with the stator upper port openings, to complete fluid transfer paths between each of the plurality of stator upper ports 20 and a different one the plurality of rotor lower ports 28, and to complete fluid transfer paths between each of the plurality of stator lower ports 22 and a different one the plurality of rotor upper ports 26 in accordance with the previously determined cycle.

Figure 4:
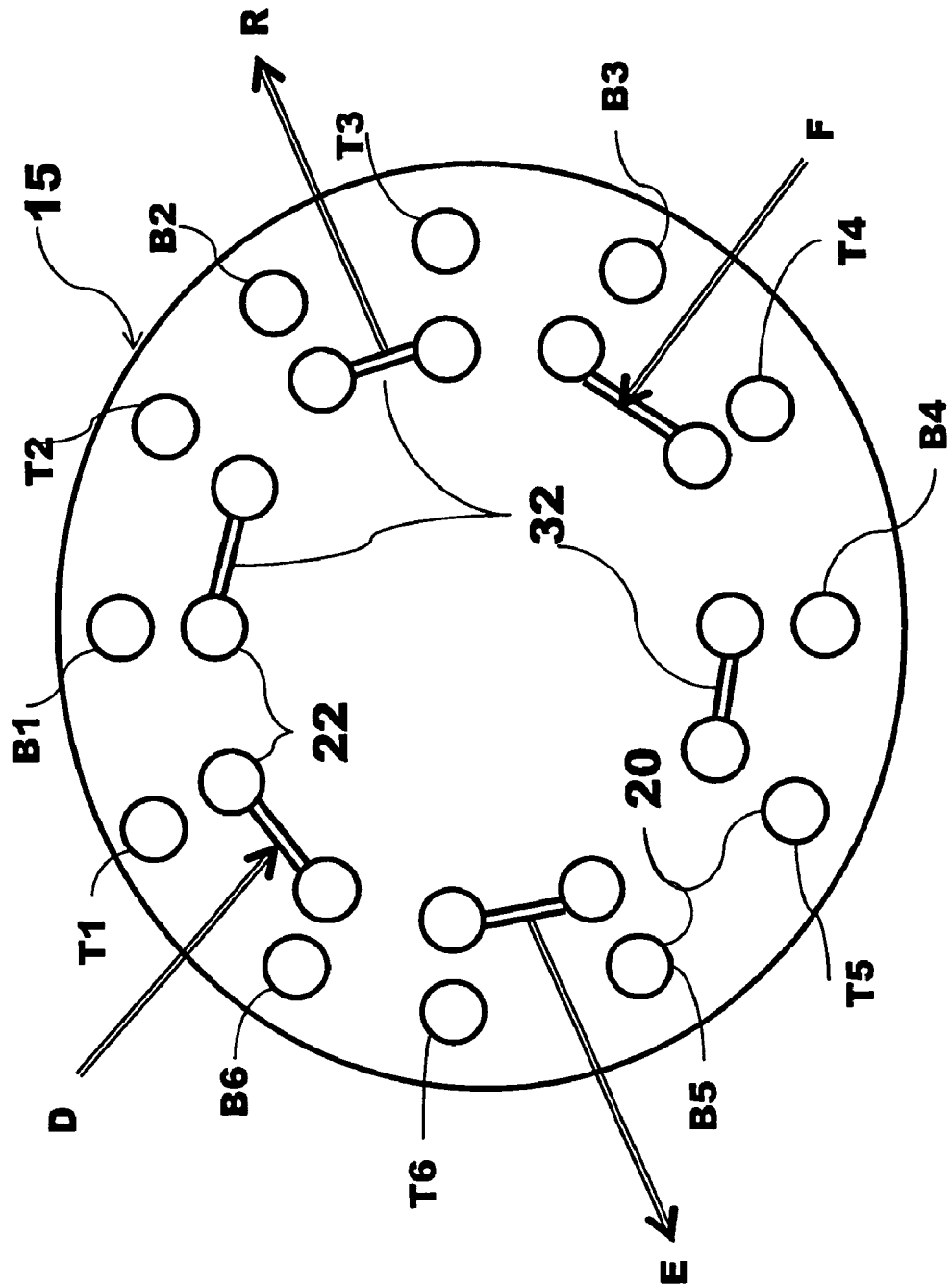
FIG. 4 is a schematic representation of an upper stator portion of the rotary valve of the present invention illustrating the external jumper conduits and the relative relationship between introduction of feed and desorbent and the removal of extract and raffinate streams from the rotary valve.

FIG. 4 is a schematic illustration of the upper stator for a 6-chamber SMB system showing an embodiment of the inter-relationship of conduits between the plurality of SMB adsorbent chambers ($C_i$) and the upper stator 15. The following abbreviations are used to denote all of the conduits, 12 in number connected between each of the plurality of adsorbent chambers $C_i$ and the upper stator. $T_i$ denotes a conduit in fluid communication between the top of each of the stationary adsorbent chambers $C_i$ and the upper stator, and $B_i$ denotes a conduit in fluid communication between the bottom of each of the stationary adsorbent chambers $C_i$ and the upper stator. The number, i, associated with either the T or the B indicates the particular stationary adsorbent chamber with which the top/bottom $T_i/B_i$ pair of conduits is associated. For example, $T_1$ refers to the conduit between the top of stationary adsorbent chamber 1 and the upper stator. Each of the conduits in fluid communication with the plurality of adsorbent chambers $C_i$ are disposed in fluid communication with each of the plurality of stator upper ports 20 in adjacent top/bottom pairs ($T_i/B_i$), in sequential order from 1 to n, where n is the total number of stationary adsorbent chambers. The plurality of stator upper ports are disposed symmetrically and radially about the axis of rotation in adjacent top/bottom pairs corresponding to each adsorbent chamber. The plurality of stator lower ports which correspond to the upper stator ports are in fluid communication with a plurality of jumper lines ($J_i$) 32 external to the rotary valve. The jumper lines $J_i$ (32) (shown internal to the rotor in FIG. 4) are disposed counter-clockwise about the axis of rotation to provide fluid transfer between the adjacent pairs (Ti/Bi) of stator lower ports $L_i$ and $L_{(i+1)}$ from $B_i$ to $T_{(i+1)}$, such that jumper line provides fluid communication between the top T1($T_i$) of chamber $C_1$ ($C_i$) and the bottom T6 of chamber $C_6$ (equivalent to $T_{(i-1)}$) and continuing counter-clock-wise around the circumference of the upper stator 15 from 1 to n. Conduits representing at least one of each of the Feed, F, the Desorbent, D, the Raffinate, R, and the Extract, E, are in fluid communication with a different one of the plurality of jumper lines, $J_i$.

Figure 5:
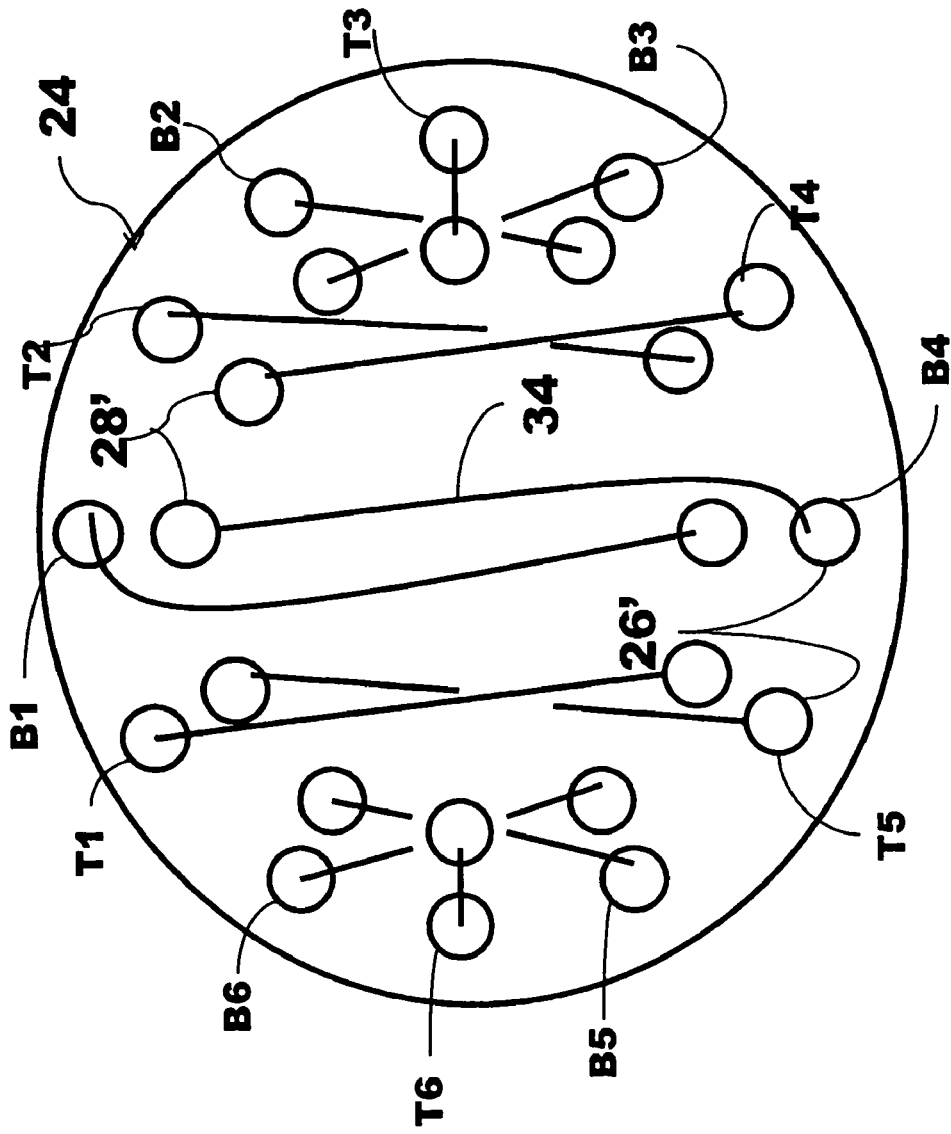
FIG. 5 is a schematic representation of the lower rotor portion of the rotary valve of the present invention illustrating the conduit arrangement for a 6-chamber SMB process.

FIG. 5 is a schematic illustration of the lower rotor for a 6-chamber SMB system showing an embodiment of the inter-relationship of conduits between the plurality of SMB adsorbent chambers ($C_i$) and the lower rotor 24. In order to show the interrelationships or flows in the plurality of crossover pipes associated with the lower rotor, the outer circle of rotor ports are labeled using the nomenclature referring to the plurality of adsorbent chambers in the 6-chamber system presented hereinabove in the discussion of the stator in FIG. 4. Each of the plurality of crossover pipes 34 communicates between two rotor openings in order to complete fluid transfer between conduits of the outer circle of rotor upper port openings 26' and the inner circle formed by the plurality of rotor lower port openings 28' in accordance with the previously determined cycle. The each of the plurality of crossover pipes rotates with the indexing or rotation of the lower rotor. The crossover pipes may be composed of a corrosion resistant metal or polymer or a combination thereof. Preferably, the upper stator, lower rotor, jumper lines, and crossover pipes comprise or are composed of corrosion resistant materials such as stainless steel, HASTELLOY (Available from Haynes International, Inc. Kokomo, Ind.), and metals lined with fluoropolymer coatings such as TEFLON (Available from E. I. du Pont de Nemours and Company, Wilmington, Del.).

Figure 6:
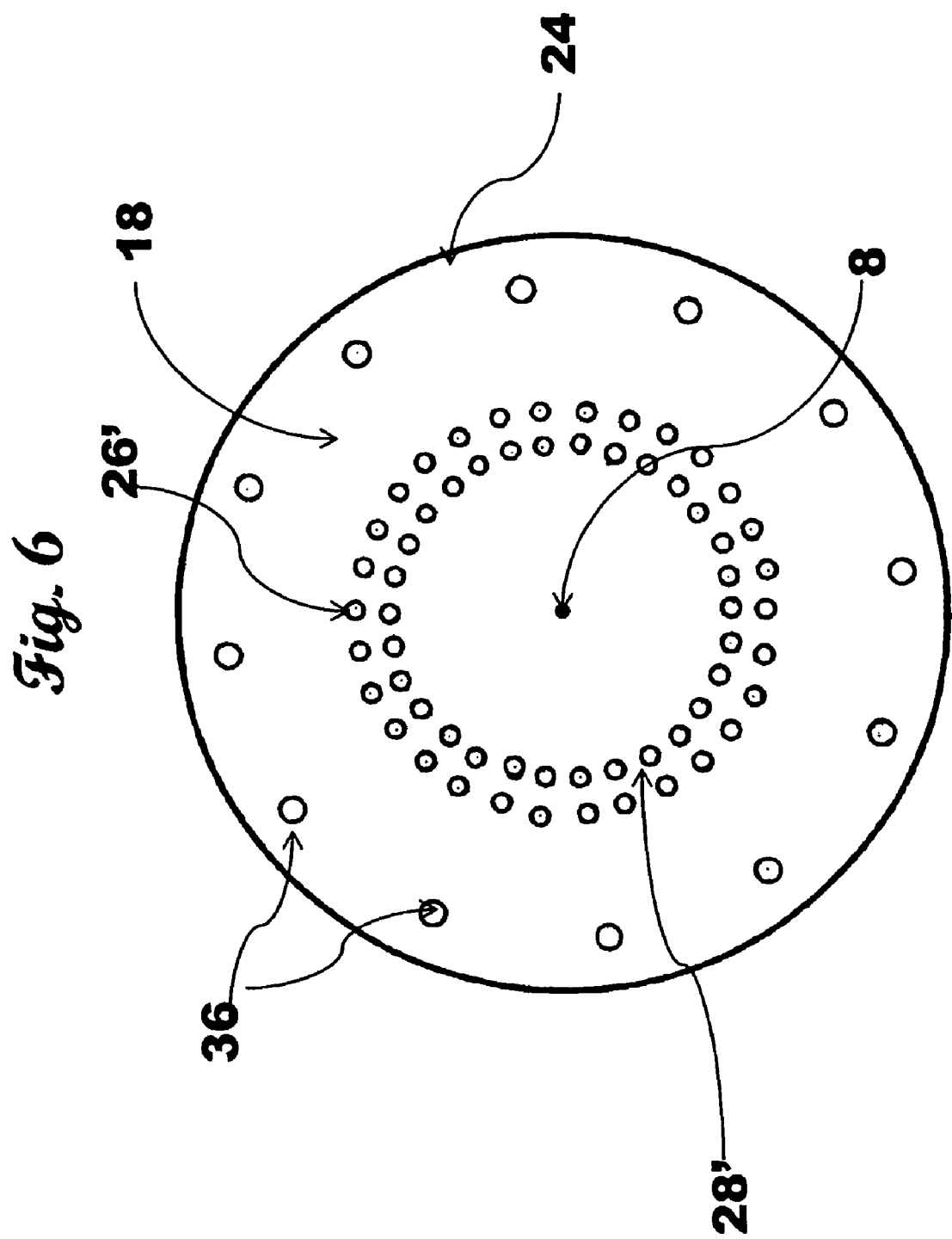
FIG. 6 is a schematic view of the top of the lower rotor of the present invention. The outer portion of the stator assembly which includes the bolt circle is shown with spacing members and studs omitted. The inner circle denotes the boundary of the seating surface.

FIG. 6 is a schematic top view of a lower rotor embodiment 24. Referring to FIG. 6, the rotor seating surface 18 is disposed on the top of the lower rotor 24. The plurality of rotor upper port openings 26', which are in fluid communication with the rotor upper ports (See FIG. 3, 26) are disposed about the axis of rotation 8 of the lower rotor 24 in an outer circle. The plurality of rotor lower port openings 28', which are in fluid communication with the lower rotor ports (See FIG. 3, Item 28) are disposed about the axis of rotation 8 of the lower rotor 24 in an outer circle. A plurality of bolt holes 36 is disposed about the circumference of the discoid lower rotor.

Figure 7:
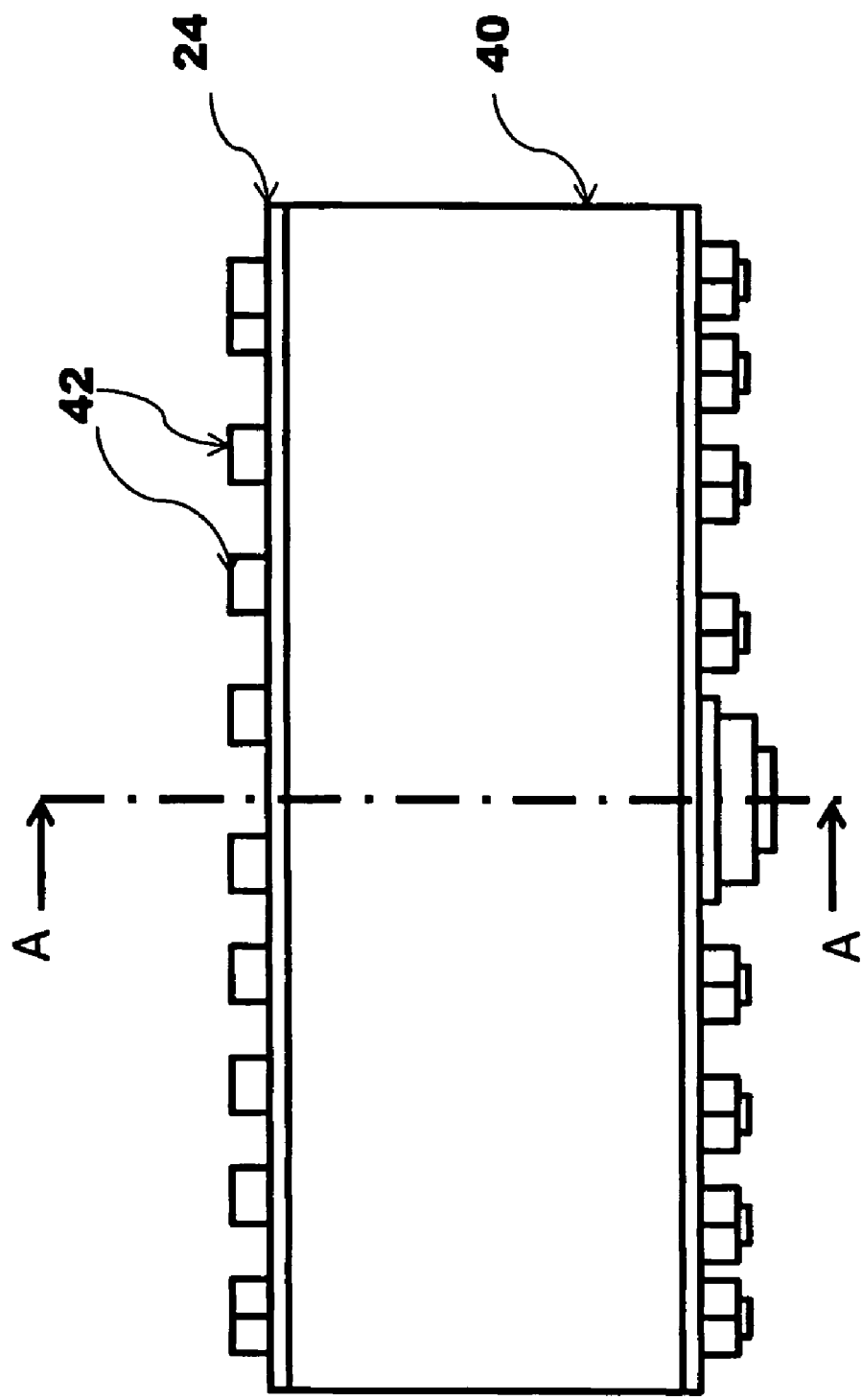
FIG. 7 is an illustration of an elevation view in schematic form of an embodiment of the lower rotor enclosure, wherein Section A-A indicates the cross sectional view of the lower rotor shown in FIG. 8.

FIG. 7 is a schematic elevation view of a lower rotor enclosure 40 which disposed on the rotor and encloses the plurality of upper and lower rotor openings and the plurality of crossover pipes which complete the fluid transfer paths between the upper and lower rotor openings in accordance with the previously determined cycle. A plurality of fasteners such as bolts 42 or other suitable fasteners such as clamps are disposed about the axis of rotation to secure the lower rotor 24 to the lower rotor enclosure in a fluid-tight manner.

Figure 8:
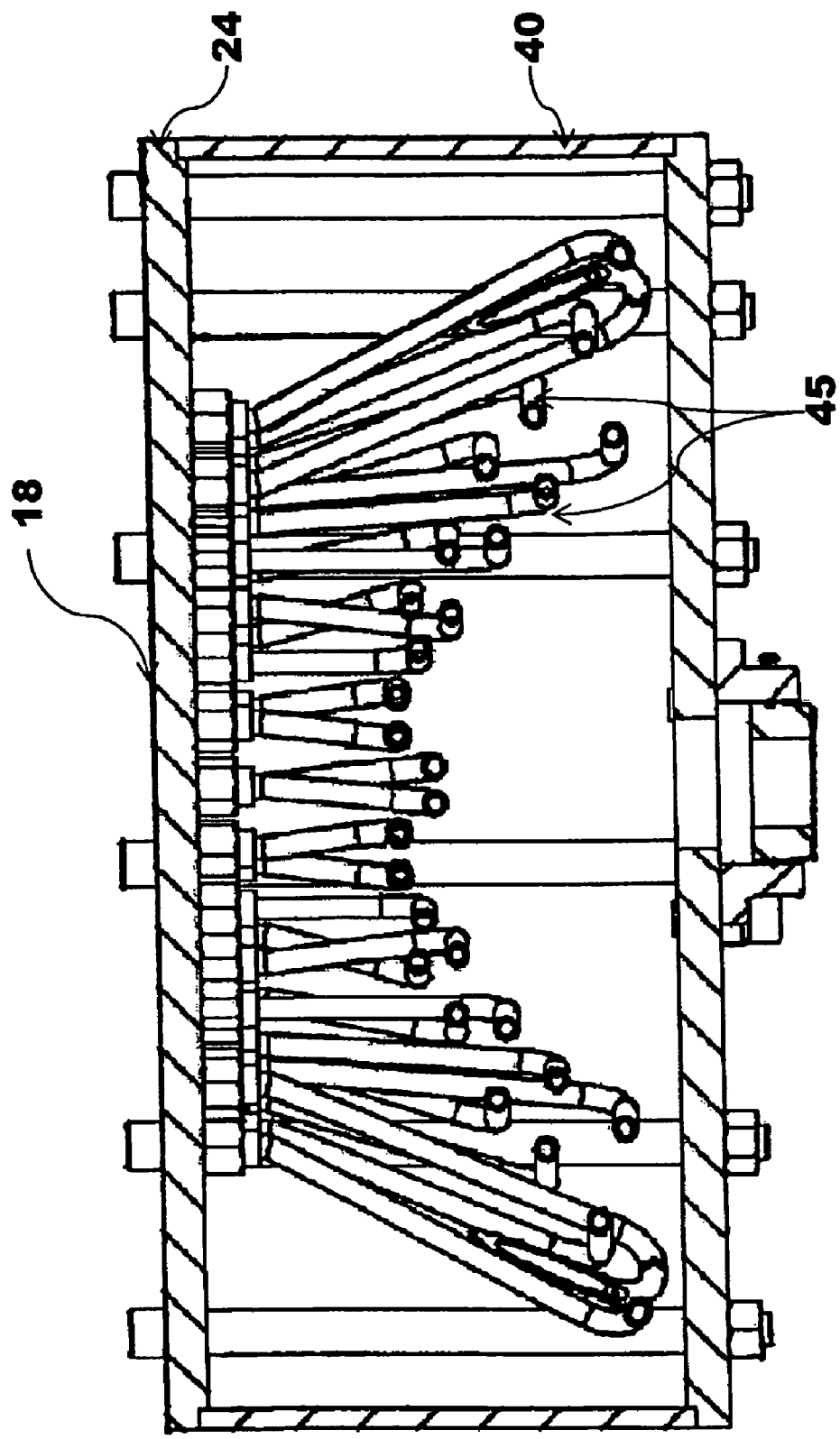
FIG. 8 is a section view of the lower rotor in schematic form at Section A-A of FIG. 7 showing the plurality of crossover pipes with certain unnecessary detail omitted and normally unseen lines added to improve understanding. It is drawn with the openings and pipes in proportion to the lower rotor diameter and shows a possible actual arrangement of crossover pipes.

FIG. 8 is a schematic cross section view of the lower rotor enclosure 40 at section A-A shown on FIG. 7 to show the lower rotor assembly having the lower rotor 24, the lower rotor enclosure 40 and the plurality of crossover pipes 45 which complete the fluid transfer paths between the rotor upper and rotor lower openings in accordance with the previously determined cycle. The sealing surface 18 of the lower rotor 24 is a substantially flat discoid plate having the sealing surface disposed on its upper surface and the plurality of crossover pipes 45 disposed on the other side of the lower rotor.

Figure 9:
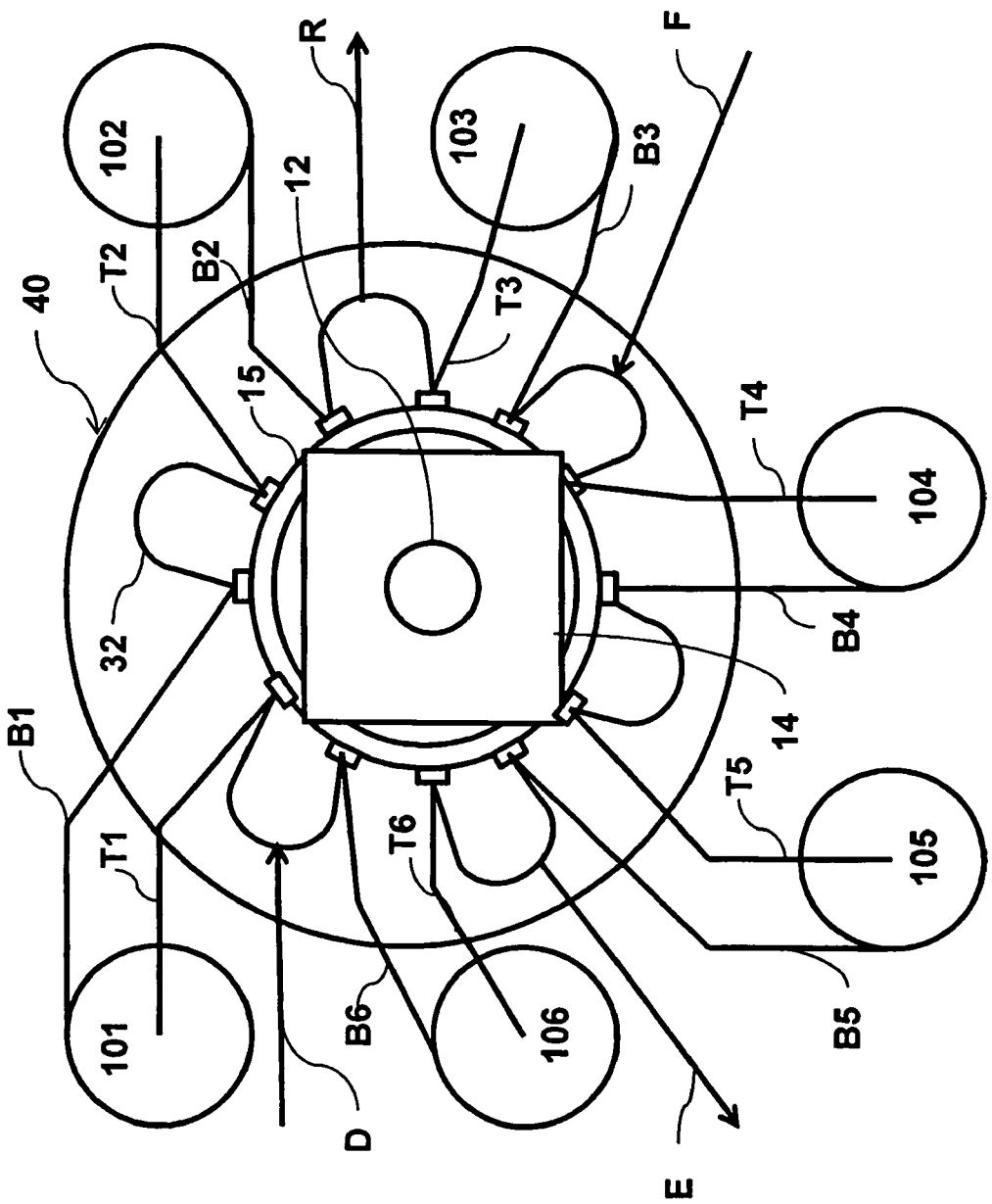
FIG. 9 is a schematic representation of a rotary valve embodiment of the present invention shown from above with interconnections for a 6 chamber configuration.
Figure 10:
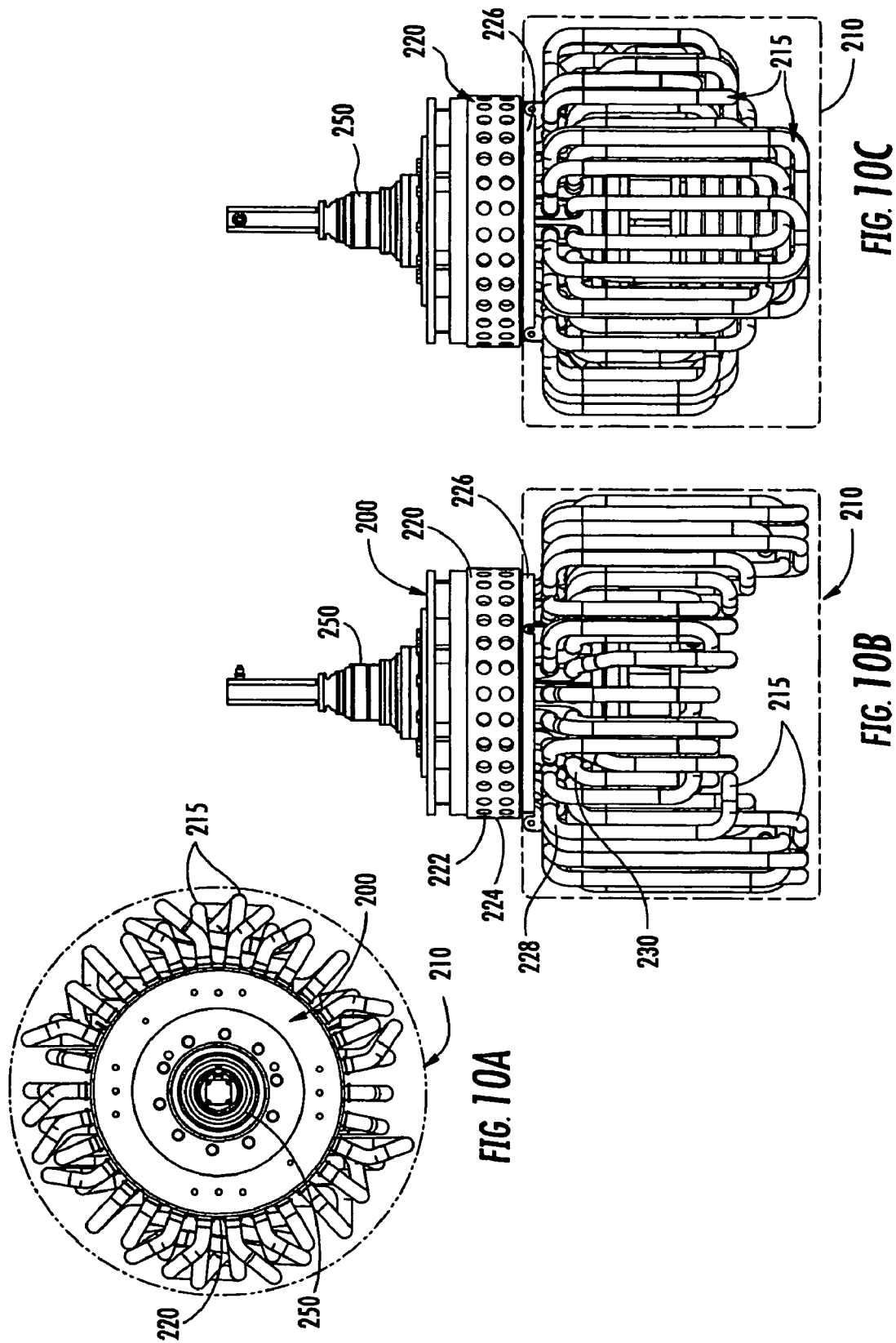
FIG. 10A depicts a schematic illustration of the top view of one embodiment of the rotary valve of the present invention for a 15 adsorbent chamber SMB system.
FIG. 10B depicts a schematic illustration of the elevation view of one embodiment of the rotary valve of the present invention for a 15 adsorbent chamber SMB system.
FIG. 10C depicts a schematic illustration of the side view of one embodiment of the rotary valve of the present invention for a 15 adsorbent chamber SMB system.

FIG. 9 is a schematic top view of one embodiment of the invention employing six adsorbent chambers for conducting a simulated moving bed process using the rotary valve described hereinabove. The six adsorbent chambers (101, 102, 103, 104, 105 and 106) are disposed asymmetrically about the rotary valve. Each of the adsorbent chambers has a top conduit and a bottom conduit. The top conduits from adsorbent chambers 101-106 are shown as conduits T1-T6, respectively; and the bottom conduits from each of the adsorbent chambers 101-106 are shown as B1-B6, respectively. At least one feed conduit, F, at least one desorbent conduit, D, at least one extract conduit, E, and at least one raffinate conduit, R, is shown in fluid communication with at least one different of the plurality of jumper lines 32. In practice, a rotary valve of the present invention can have one or more feed conduit, F, one or more desorbent conduit, D, one or more extract conduit, D, and one or more raffinate conduit, R. The indexing motor or means for indexing the rotary valve is mounted above a valve mounting block 14. The valve mounting block 14 and the adsorbent chambers may be supported by any stationary structural support system which is sufficient to support the weight of the system. The valve mounting block 14 serves to rigidly support the indexing motor and also support the upper stator 15. Each of the top conduits T1-T6 and the bottom conduits B1-B6 are in fluid communication with the upper stator through stator upper ports (not shown) in sequential order from 1 to 6, disposed symmetrically about the rotary valve such that each top conduit Ti is adjacent to each corresponding bottom conduit Bi. A plurality of jumper lines 32 are disposed external to the rotary valve to provide fluid transfer between adjacent pairs of stator lower ports (not shown) disposed counterclockwise shown between the following conduit pairs: B6/T1, B5/T6, B4/T5, B3/T4, B2/T3, B1/T2. A feed conduit, F, a desorbent conduit, D, a raffinate conduit, R, and an extract conduit E are shown in fluid communication with at least one different one of the plurality of jumper lines 32. The lower rotor, the plurality of rotor upper and rotor lower ports, and the plurality of crossover pipes (not shown) are enclosed in a lower enclosure 40.

FIG. 10A depicts a schematic illustration of the top view of one embodiment of the rotary valve 200 of the present invention for a 15 adsorbent chamber SMB system. The lower rotor enclosure 210 is exposed to show the configuration of the plurality of 30 jumper lines 215 which provide fluid communication between the rotor upper ports and the rotor lower ports according to the previously determined cycle, as described hereinabove. For clarity the upper stator 220 which is in fluid communication with the 15 adsorbent chambers is shown without the top and bottom conduit pairs corresponding to each adsorbent chamber (not shown). The means for turning or rotating the lower rotor 250 or a means for indexing the rotary valve according to the previously determined cycle is shown disposed above the upper stator 220.

FIG. 10B depicts a schematic illustration of the elevation view of one embodiment of the rotary valve 200 of the present invention for a 15 adsorbent chamber SMB system. The upper stator 220 is disposed on the lower rotor 226. The upper stator has a plurality of stator upper ports 222 and a plurality of stator lower ports 224. The conduits between the upper stator and the stationary adsorbent chambers and the jumper lines are not shown. The lower rotor has a plurality of rotor upper ports 228 and rotor lower ports 230. For the 15 adsorbent chamber configuration, there are 30 rotor upper ports 228 and 30 rotor lower ports 230. A plurality of crossover pipes 215 provide fluid communication between the groups of rotor upper ports 228 and the group of rotor lower ports, according the previously determined cycle. The lower rotor enclosure 210 encloses the plurality of crossover pipes 215 and the groups of rotor upper ports and rotor lower ports, rotating with the lower rotor as indexed by the means for turning or indexing the lower rotor 250.

FIG. 10C depicts a schematic illustration of the side view of one embodiment of the rotary valve 200 of the present invention for a 15 adsorbent chamber SMB system. The means for turning or indexing the lower rotor 250 is disposed on the upper stator 220 which is in fluid tight contact with the lower rotor 226. The lower rotor enclosure 210 is removed to show the configuration of the plurality of crossover pipes 215 as disclosed hereinabove.

Figure 11:
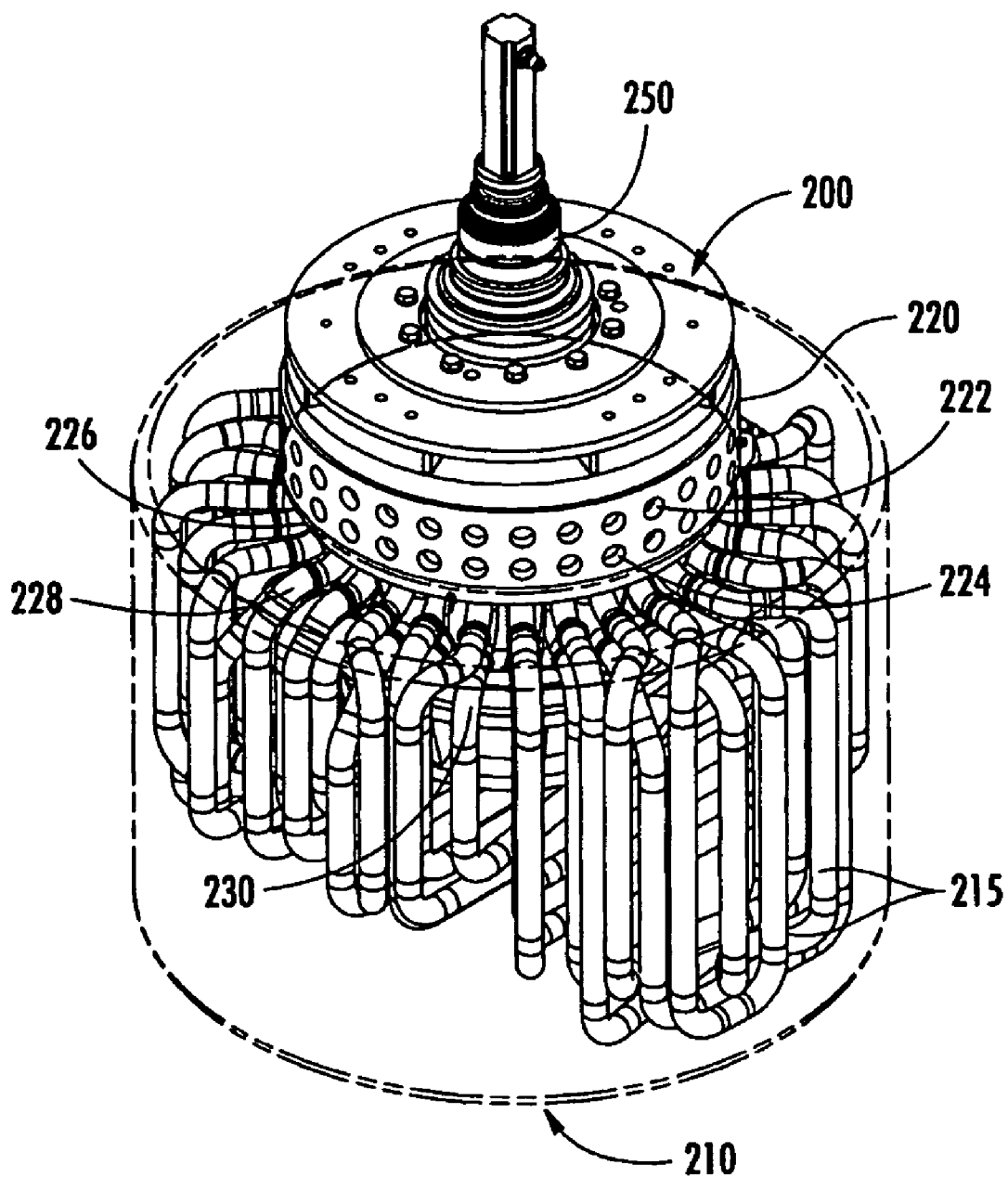
FIG. 11 depicts a schematic illustration in an isometric view of one embodiment of the rotary valve of the present invention for a 15 adsorbent chamber SMB system.

FIG. 11 depicts a schematic illustration in an isometric view of one embodiment of the rotary valve 200 of the present invention for a 15 adsorbent chamber SMB system. The means for turning or rotating the lower rotor 250 or a means for indexing the rotary valve 200 according to the previously determined cycle is shown disposed above the upper stator 220. The upper stator shown without conduits to the plurality of stator upper ports 222 and stator lower ports 224 is disposed in fluid tight contact with the lower rotor 226. The plurality of crossover pipes 215 is shown providing fluid communication between the rotor upper ports 228 and rotor lower ports 230 according to the previously determined cycle.

It may be necessary to place pipe expansion joints in the crossover pipes to prevent damage to the valve and/or leakage due to expansion caused by high temperature fluids flowing through the valve. An elastomeric liner (not shown) located between the substantially flat seating surface of the upper stator and the seating surface of the lower rotor will facilitate sealing. A liner would cover and be affixed to one of the seating surfaces and would contain apertures, or holes, for fluid to pass through so as not to block the fluid transfer paths through the valve. The apertures would correspond to the port and openings. As discussed above, it might be desirable to utilize flushing fluids; one way of doing this is to add additional conduits, ports, and openings to carry and transfer the flushing fluids.

When a rotary valve is referred to as indexing, it is meant that the rotor is moving. A valve index position refers to one of the positions of a rotor which is stationary and where ports and openings are in register. That the stator and rotor seating surfaces are referred to as substantially flat in certain embodiments does not preclude the surfaces of those embodiments from having ridges or other projections to aid in sealing nor is a taper to facilitate sealing precluded such as discussed in the herein incorporated references.

The components of the present invention may be fabricated from suitable materials of construction, such as metals or plastics. Sizing of the flow channels, such as the conduits, ports, and openings, is easily accomplished by reference to any of the numerous standard methods which are available.

From the foregoing description, one skilled in the art can easily ascertain the essential characteristics of the instant invention and without departing from the spirit and scope thereof can make various changes and modifications of the invention to adapt it to various usages and conditions.

The invention claimed is:

1. A simulated moving bed apparatus for carrying out a simulated moving bed process, said apparatus comprising:
   a. a plurality of n stationary adsorbent chambers ($C_i$) comprising adsorbent material, each of said stationary adsorbent chambers having a top conduit ($T_i$) and a bottom conduit ($B_i$) to permit the flow of fluid to and from each of the stationary adsorbent chambers;
   b. a rotary valve having an axis of rotation about which when indexed directs the distribution of fluids into and out of the plurality of n stationary chambers in a previously determined cycle, said rotary valve comprising:
      i. an upper stator having a substantially flat seating surface, a plurality of 2n stator upper ports $U_j$ and a plurality of 2n stator lower ports $L_j$, each of the stator upper ports $U_j$ extending through said upper stator to the substantially flat seating surface forming a plurality of 2n stator upper openings $UPO_j$ in the substantially flat seating surface to provide fluid communication with each of the top conduits $T_i$ and each of the bottom conduits $B_i$ associated with stationary adsorbent chamber $C_i$ disposed in top/bottom pairs $T_i/B_i$ such that each top conduit $T_i$ is adjacent to each corresponding bottom conduit $B_i$, said top/bottom pairs $T_i/B_i$ being disposed radially about the axis of rotation clockwise in sequential order from 1 to n, said plurality of 2n stator upper port openings $UPO_j$ being disposed symmetrically about the axis of rotation describing an inner circle and said plurality of 2n stator lower ports $L_j$ extending through said upper stator to the substantially flat seating surface forming a plurality of 2n stator lower port openings $LPO_j$ being disposed symmetrically about the axis of rotation describing an outer circle of stator lower port openings $LPO_j$ in said substantially flat seating surface;
      ii. a plurality of n jumper lines $J_i$ external to the rotary valve in fluid communication with and to provide fluid transfer between adjacent pairs of stator lower ports $L_j$, each jumper line $J_i$ being disposed counterclockwise the axis of rotation such that jumper line $J_i$ provides fluid transfer between the top conduit $T_i$ and the bottom conduit $B_{(i-1)}$ in the previously determined cycle;
      iii. at least one feed conduit, at least one desorbent conduit, at least one raffinate conduit, and at least one extract conduit each being in fluid communication with at least one different one of said plurality of jumper lines $J_i$ in the previously determined cycle;
      iv. a lower rotor having a rotor seating surface which is in fluid-tight contact with said substantially flat seating surface of the upper stator which lower rotor rotates about said axis of rotation to various valve positions in accordance with said previously determined cycle, where said axis of rotation passes through the center of both the lower rotor and the upper stator and is normal to said rotor seating surface and said substantially flat seating surface, said lower rotor having a plurality of rotor upper ports and a plurality of rotor lower ports, each of said rotor upper port extending through said lower rotor to said rotor seating surface forming a plurality of rotor upper port openings $RUO_j$ in said rotor seating surface and said rotor lower ports extending through said lower rotor to said rotor seating surface forming a plurality of rotor lower port openings $RLO_j$ in said rotor seating surface, said plurality of rotor upper port openings $RUO_j$ being disposed symmetrically around the axis of rotation describing an outer circle forming an outer group of rotor openings and said plurality of rotor lower port openings $RLO_j$ being disposed symmetrically around the axis of rotation describing an inner circle and forming an inner group of rotor openings, each of the plurality of the stator upper port openings $UPO_j$ being in register with a different one of the openings of the rotor lower port openings $RLO_j$ and each of the plurality of the stator lower port openings $LPO_j$ being in register with a different one of the openings of the rotor upper port openings $RUO_j$;
      v. a plurality of crossover pipes connected to the lower rotor, each crossover pipe communicating between two rotor openings in order to complete fluid transfer paths between conduits of said outer and inner groups of rotor openings in accordance with said previously determined cycle; and
      vi. a lower rotor enclosure having a hollow interior, said lower rotor enclosure completely enclosing said plurality of crossover pipes in fluid-tight contact with said other side of the lower rotor such that the lower rotor enclosure rotates with said lower rotor when the rotary valve is indexed; and,
   c. a means for indexing the rotary valve according to the previously determined cycle.

2. The simulated moving bed apparatus of claim 1, wherein said plurality of n stationary adsorbent chambers ($C_i$) are non-rotating and are disposed in an asymmetrical manner about the axis of rotation of the rotary valve.

3. The simulated moving bed apparatus of claim 1, wherein the means for indexing the rotary valve according to the previously determined cycle is a hydraulic, electrical, or electromechanical device.

4. The simulated moving bed apparatus of claim 1, wherein the upper stator and lower rotor comprise corrosion resistant materials.

5. The simulated moving bed apparatus of claim 4, wherein the corrosion resistant materials are selected from the group consisting of stainless steel, corrosion resistant alloys, metals having a fluoropolymer coating, and mixtures thereof.

6. The simulated moving bed apparatus of claim 1, wherein the plurality of crossover pipes comprise a corrosion resistant metal or polymer or a combination thereof.

7. The simulated moving bed apparatus of claim 1, wherein the number of adsorbent chambers ranges from 5 to 40.

8. The simulated moving bed apparatus of claim 1, wherein the number of adsorbent chambers ranges from 10 to 30.

9. The simulated moving bed apparatus of claim 1, further comprising a single liquid circulation pump to provide continuous flow in each adsorbent chamber of the plurality of the adsorbent chambers in the simulated moving bed apparatus.

* * * * *